Figure 1:
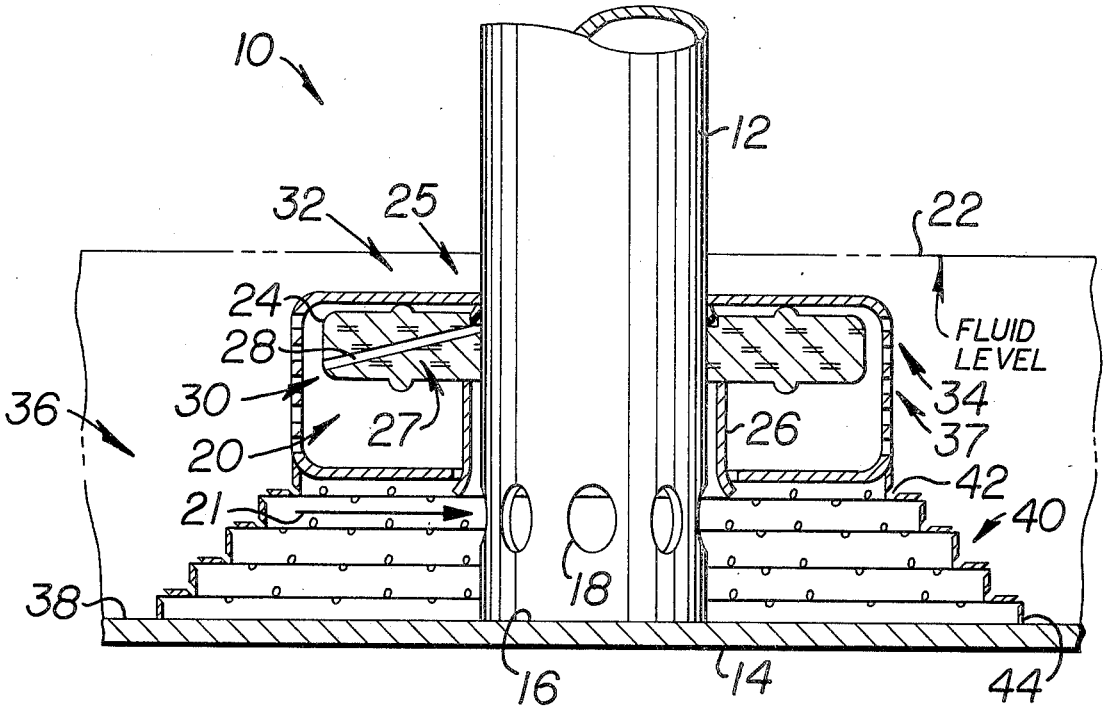
Figure 2:
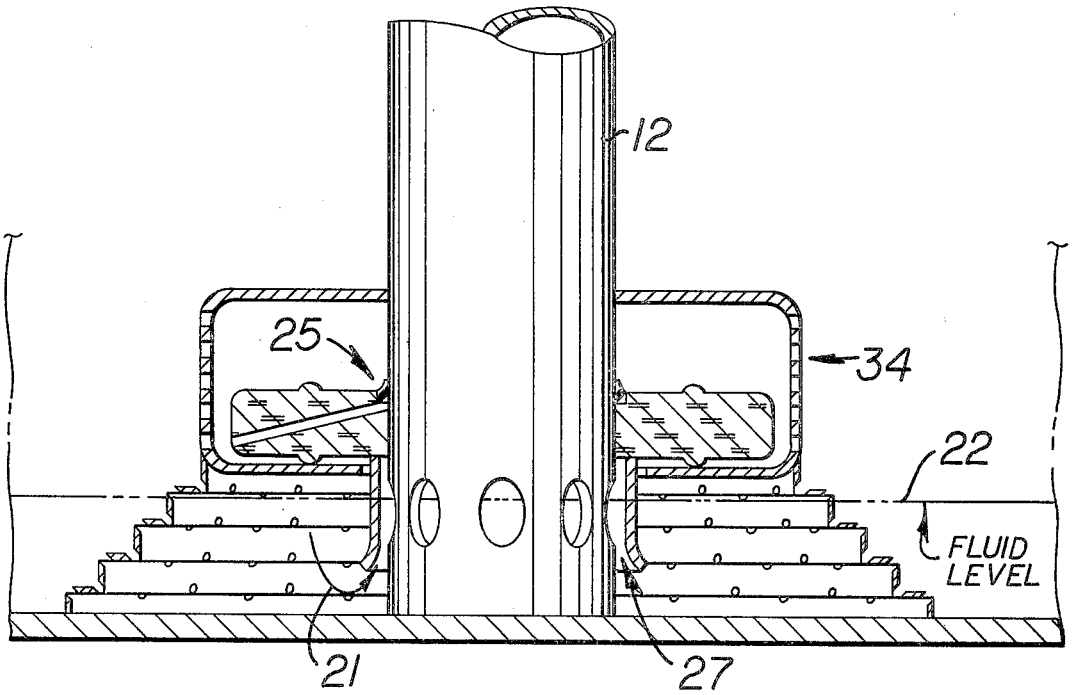

United States Defensive Publication [19] (H) [11] T987,002

Hansen [43] Oct. 2, 1979

[54] RESERVOIR WITH CONTROLLED PATHWAY TO A PUMP SUCTION LINE

[75] Inventor: Robert C. Hansen, East Peoria, Ill.

[73] Assignee: Caterpillar Tractor Co., Peoria, Ill.

[21] Appl. No.: 950,878

[22] Filed: Oct. 12, 1978

[51] Int. Cl.[2] ..... B01D 29/20; B01D 35/02; B01D 35/14

[52] U.S. Cl. ..... 210/121; 210/242 R; 210/416 R; 210/435; 210/460

[57] ABSTRACT

A reservoir (10) for a scavenging system has a suction line (12) of a pump disposed within the reservoir and a float mechanism (24) that controls the fluid pathway (21) from the reservoir into the suction line (12) in response to the height (22) of the fluid within the reservoir. This system restricts large volume of air from being drawn into the suction line as the fluid level in the reservoir is lowered. The float mechanism includes a sealing arrangement (25) to restrict air from being introduced into the openings from around the float mechanism (24) during operation of the system. An apparatus (26) is also associated with the float mechanism (24) to cause the pathway (21) to be significantly lowered relative to the level (22) of the fluid and the openings (18) in the suction line (12). This system allows the fluid level (22) in the reservoir (10) to be at a very low level without drawing any appreciable amount of air into the suction line (12), while providing very low restriction to the flow of the fluid into the suction line (12) at high levels (22) of the fluid.

8 Claims, 1 Sheet Drawing,

8 Pages Specification

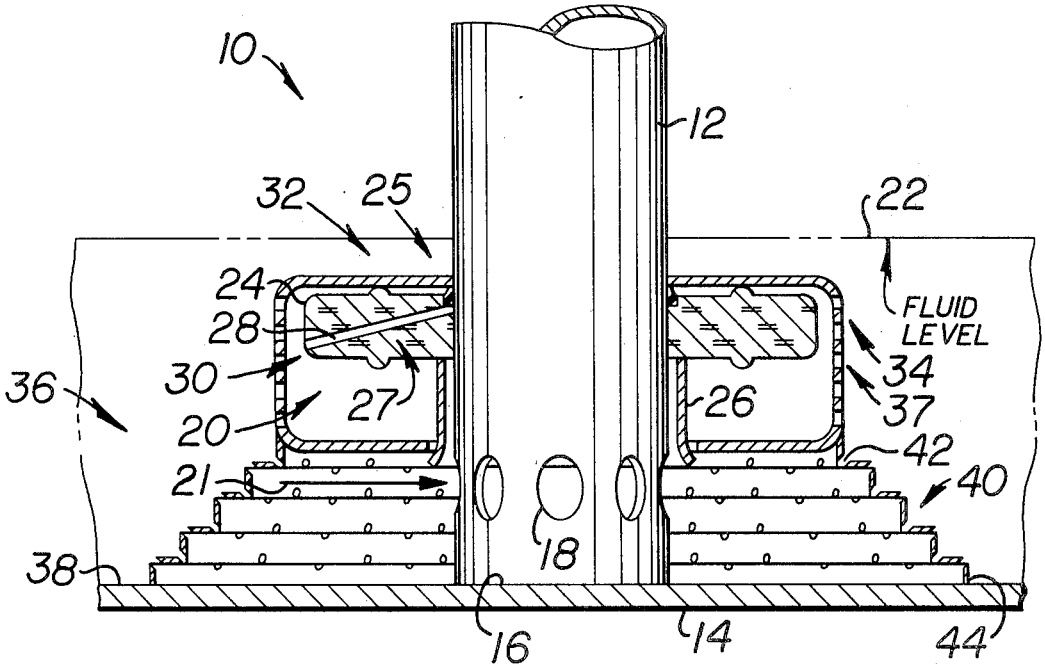

The file of this unexamined application may be inspected and copies thereof may be purchased (849 O.G. 1221, Apr. 9, 1968).